United States Patent [19]

Rhodes et al.

[11] 4,167,962
[45] Sep. 18, 1979

[54] SLIDE ASSEMBLY FOR A CUTTING MACHINE

[76] Inventors: Arthur J. Rhodes, 2601 Benoch Ave., Louisville, Ky. 40216; William J. Rhodes, 3343 Camp Ground Rd., Louisville, Ky. 40211

[21] Appl. No.: 890,138

[22] Filed: Mar. 27, 1978

[51] Int. Cl.² ............................................. B27C 5/02
[52] U.S. Cl. ............................... 144/145 A; 409/110; 409/111
[58] Field of Search ...................... 90/13.2, 13.5, 13.6, 90/13.4, 13.3; 144/139, 144 R, 145 R, 144.5, 134 R, 137, 134 A, 145 A, 143, 154

[56] References Cited

U.S. PATENT DOCUMENTS

| | | | |
|---|---|---|---|
| 1,337,695 | 4/1920 | Emery | 144/145 A |
| 2,141,631 | 12/1938 | Whitney et al. | 144/145 A |
| 3,194,121 | 7/1965 | Colonius et al. | 90/13.2 |
| 3,473,580 | 10/1969 | Dunn et al. | 144/145 R X |
| 3,584,665 | 6/1971 | Gemmani | 144/145 A |
| 3,739,826 | 6/1973 | Schell | 144/145 R |
| 3,841,370 | 10/1974 | Schell | 144/145 R X |
| 3,880,048 | 4/1975 | Zimmerman | 144/145 A X |
| 3,885,611 | 5/1975 | Schell | 144/145 R |
| 4,036,269 | 7/1977 | Rhodes | 144/145 R X |

*Primary Examiner*—Robert Louis Spruill
*Assistant Examiner*—W. D. Bray
*Attorney, Agent, or Firm*—Charles G. Lamb

[57] ABSTRACT

In combination with automatic shaping equipment, a feed device for feeding material to the equipment is described wherein a feed member is mounted for engagement with means to feed a workpiece to the shaping equipment. A cam follower assembly for cooperating with the feed member is also provided, the cam follower assembly being movable in horizontal and vertical directions independent of the feed member.

6 Claims, 4 Drawing Figures

SLIDE ASSEMBLY FOR A CUTTING MACHINE

BACKGROUND OF THE INVENTION

(1) Field of the Invention

This invention relates to feed means for automatic shaping equipment and particularly relates to a slidable assembly for the feed means for automatic shaping equipment.

(2) Discussion of the Prior Art

In the production of duplicate parts having irregular shapes, such as, for example, pieces that go into making wood furniture, many different types of feeding devices are used for feeding workpieces to cutting or shaping machines. Most of the feeding devices include means to mount templates or patterns thereon with means to follow the patterns and feed the workpieces to cutting or shaping machines in conformity with a predetermined pattern. In many of the feed devices, the means for feeding workpieces in conformity with a predetermined pattern are generally complex and require a great deal of skill and time on the part of the operator in order to maintain the feeding and shaping machines at reasonable production rates. One such shaper is disclosed in U.S. Pat. No. 3,447,420.

SUMMARY OF THE INVENTION

The present invention advantageously provides a feed means for an automatic shaping device. The present invention further provides a feed means for an automatic shaping machine which is easy and quickly operable.

Various other features of the present invention will occur to those skilled in the art upon reading the disclosure set forth hereinafter.

More particularly, the present invention provides in combination with automatic shaping equipment, a feed device for feeding material to said automatic shaping equipment comprising: a frame; a table mounted onto said frame; a flat plate member slidably mounted to said frame and spaced beneath said table; a feed member mounted for engagement with means to feed a workpiece to said shaping equipment; drive means drivably connected to said feed member; a cam follower assembly attached to said flat plate member cooperating with said feed member for engagement with said means to feed a workpiece to said shaping equipment, said cam follower assembly being horizontally movable independent of said feed member; and, means to raise and lower said cam follower assembly.

It is to be understood that the description of the examples of the present invention given hereinafter are not by way of limitation and various modifications within the scope of the present invention will occur to those skilled in the art upon reading the disclosure set forth hereinafter.

BRIEF DESCRIPTION OF THE DRAWING

Referring to the drawing.

DESCRIPTION OF THE PREFERRED EMBODIMENT

Figure 1:
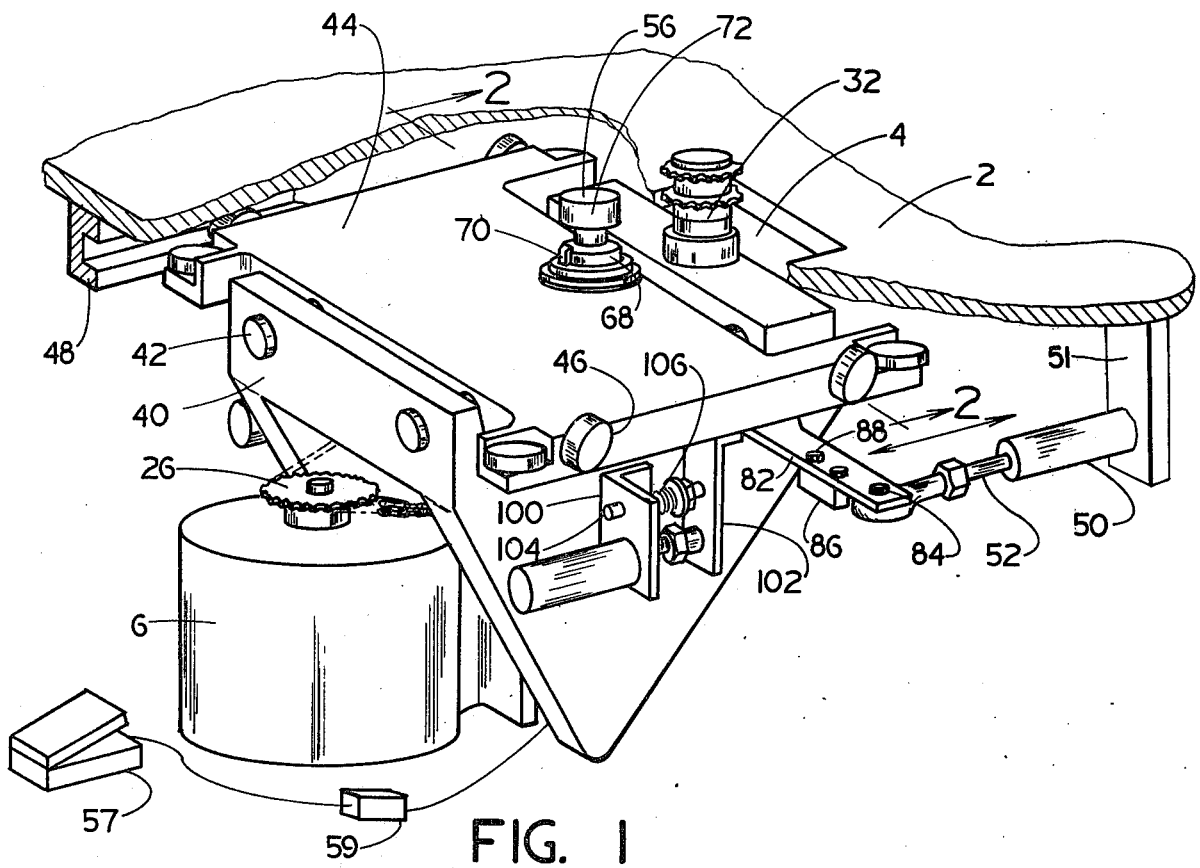
FIG. 1 is a perspective view, partially cut-away, of a feed device of the present invention.
Figure 2:
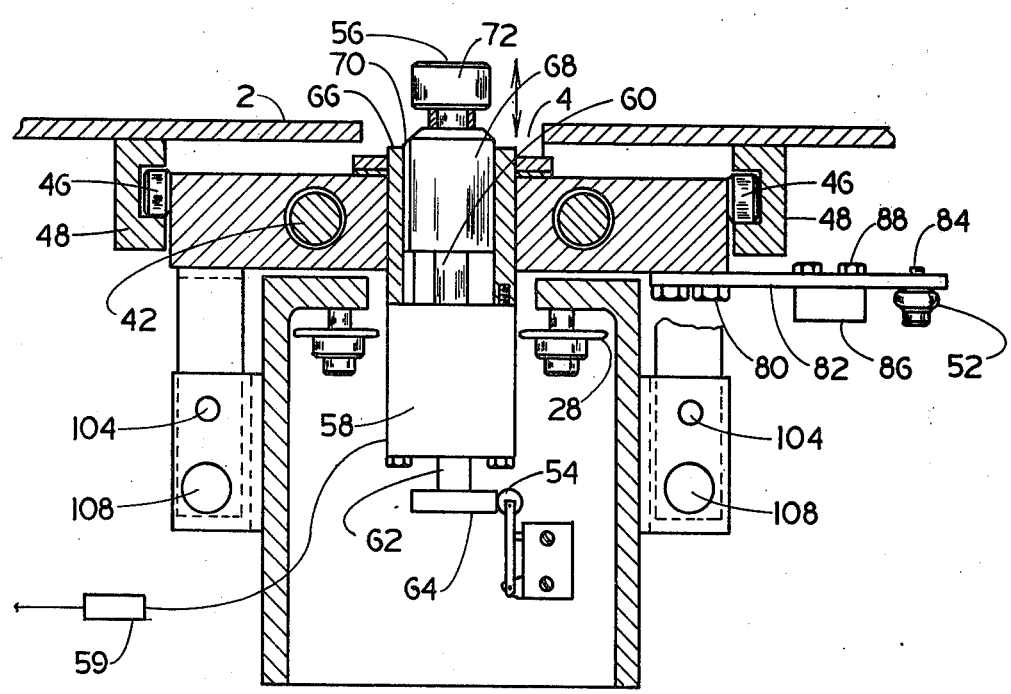
FIG. 2 is a cross-sectional view taken in a plane passing through line 2—2 of FIG. 1.
Figures 3, 4:
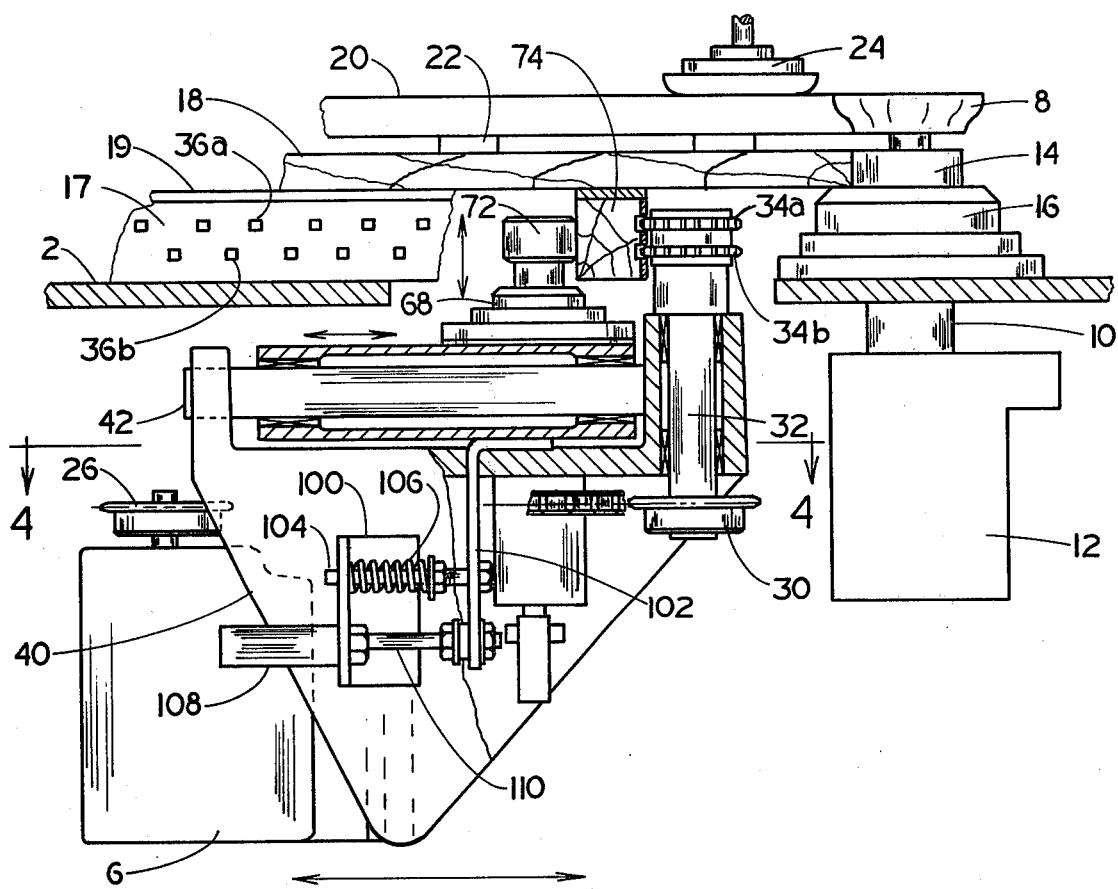
FIG. 3 is an elevational view with selected portion cut-away of the feed device of FIG. 1; and, FIG. 4 is a plan view of the drive means for the feed device of FIG. 1.

In a preferred embodiment of the present invention, as shown in FIG. 1, a feed device for shaping equipment includes a large horizontal table top 2 with a smooth surface upon which objects can slide around with complete freedom of movement by rotation or translation or both. And, as best shown in FIG. 3, a track 17 is mounted onto the table 2 for movement thereon upon engagement with drive means, to be discussed hereinafter. Mounted onto the track 17 is a pallet 19 which supports a template 18 and a workpiece 20. For a better understanding of one workpiece feed assembly for use with a cam follower assembly of the present invention, reference is made to U.S. Pat. No. 3,447,420.

A conventional rotary cutting tool 8 is mounted for rotation on a vertical axis on a drive shaft 10 which is energized by a conventional motor in a housing 12. Beneath the cutting tool 8 is a stationary abutment 14 of cylindrical form, co-axial with shaft 10. A bottom flange 16 is provided on abutment 14 underlining and supporting the edge of the template 18 which carries a pattern of preselected configuration thereon. A workpiece 20 is carried by the template 18 and rotated thereby for engagement with cutting tool 8. Shims 22 of preselected thickness are provided for spacing the workpiece 20 from the template 18 for proper alignment of the workpiece 20 with the cutting tool 8. A hold down means, shown as a stationary shoe 24, is provided to hold the workpiece 20 tight against the template 18 to prevent slippage of the workpiece 20 upon engagement with the cutting tool 8. It is realized that other hold down means, such as clamps, and the like, may also be used.

In FIG. 1, table top 2 is provided with an opening 4 therethrough to receive the drive means for the feed device of the present invention. The drive means includes a drive motor 6 to which a driving sprocket 26 is mounted and driven thereby. The drive means further includes a pair of idlers 28 and a sprocket wheel 30 (FIG. 4) with an appropriate chain 29 to which a vertically extending rotatable mounted drive shaft 32 is attached. Mounted to the upper extremity of drive shaft 32 is a twin unit pinion having an upper set of teeth 34a and a lower set of teeth 34b for engaging with cooperating apertures in track 17, track 17 having two rows of apertures identifiable by numerals 36a and 36b. The two sets of teeth 34a and 34b are rigid with respect to each other and co-axial therewith. Preferably, the teeth of 34a and 34b are offset in respect to each other by half the pitch of the gear teeth so that the upper row of apertures 36a receive the teeth 34a and the lower row of apertures 36b receive the teeth 34b. This offset arrangement enables teeth 34a to be in transition from one rack tooth to the next and simultaneously therewith teeth 34b are in the middle of their working path so they have perfect and effective arrangement at a time when teeth 34a are positioned at angles whereby they do not carry the load effectively. This enables smooth and effective driving of the track 17.

The feed device includes a stationarily mounted frame member 40 with a pair of aligned apertures on opposed sides thereof to receive a pair of rod members 42 therethrough. Rod members 52 slidably support a movable flat plate member 44 thereon. Flat plate member 44 on opposed sides thereof is provided with a pair of aligned apertures through which the rod members 42 are received. Movable flat plate member 44 is provided with a pair of rollers 46 on each end thereof movable within elongated brackets 48 of L-shaped cross-section. Brackets 48 are fixedly attached, generally by welding to the underside of table 2.

The driving force for moving the feed device in a horizontal direction is an air cylinder 50 fixedly attached to the table 2 with a bracket 51 with a movable piston 52 therein movable in response to actuation of a pneumatic switch 54. Pneumatic switch 54 is actuated by the movement of cam follower assembly 56 thereby. The cam follower assembly 56 includes an air cylinder 58 disposed in an upward direction with a movable piston 60 extending therethrough. The movable piston 60 on the lower end therein includes a shaft 62 movable therewith with a flange 64 on the lower extremity thereof. Flange 64 is disposed for engagement with switch 54 as the piston 60 moves thereby. Actuation of piston 60 is in response to any known means in the art, such as a manually operated switch means with an appropriate actuating device, such as a foot pedal 57 with appropriate electrical connection therewith. Since actuating means are well known in the art, they are not discussed further herein.

The cam follower assembly 56 includes a guide sleeve 66 fixedly attached to the upper end of air cylinder 58 to receive movable collar 68 therein. Sleeve 66 is provided with a key-way to receive a key 70 therein. Key 70 is attached to the collar 68. On the upper extremity of the piston 60 is a cam follower 72, cam follower 72 being movable upon movement of piston 60 and disposed for engagement with the inner surface 74 (FIG. 3) of track 17.

Bolted to the underside of flat plate member 44 by bolts 80 is a horizontally extending flat plate support 82 to which one end of the piston 52 is attached, piston 52 being bolted to support 82 by bolt member 84. Also attached to the support 82 is a stop member 86 which is a vertically attached flat plate member, stop member 86 being attached to the support 82 by bolt members 88.

The feed device is also provided with biasing means to hold the cam follower 72 against the inner surface 74 of track 17 and yet allow for varying thicknesses of track 17 without interfering with the operation of the device of the present invention. The biasing means includes an outwardly extending L-shaped bracket 100 fixedly attached, generally by welding, to frame member 40. Another L-shaped bracket 102 which is downwardly extending and fixedly attached to movable plate member 44, generally by welding, is also provided. Bracket 100 includes an aperture therein to receive a bolt 104 therethrough. Bolt 104 extends through the bracket 100 and is fixedly attached to bracket 102 with a spiral spring 106 therearound disposed between brackets 100 and 102. An air cylinder 108 with piston 110 operable thereby is also attached to brackets 100 and 102 to maintain a positive pressure on plate member 44 through the bracket 102. Thus, upon changes in the thickness or other variables of the track 17, cooperation of the biasing means and the air cylinder means allows for movement of the cam follower assembly to compensate for the malfunction without harming the equipment.

In the operation of the feed device of the present invention, a template 18 and a workpiece 20 are mounted onto a pallet 19, as discussed hereinbefore, with a stationary shoe 24 being placed upon workpiece 20 to hold the workpiece 20 in a fixed position upon the pallet 19. Foot pedal 57 is then depressed to actuate pneumatic valve 59 and air cylinder 58 which moves cam follower assembly 56 upwardly from its lowered position. As cam follower assembly 56 moves upwardly, flange 64 of piston 60 moves past pneumatic switch 54 which actuates air cylinder 50. Air cylinder 50 having a piston 52 attached through appropriate linkage to plate member 44 pulls the plate member 44 with cam follower assembly 56 attached thereto into engagement with the inner surface 74 of track 17. Drive motor 6 for the feed device is then energized and through cooperating drive elements discussed hereinbefore drives the twin unit pinion 34 thereby turning the workpiece 20 in conformity to the template 18.

It will be realized that various changes may be made to the specific embodiment shown and described without departing from the principles of the present invention.

What is claimed is:

1. In combination with automatic shaping equipment a feed device for feeding material to said automatic shaping equipment comprising:
   a frame;
   a table mounted onto said frame;
   a flat plate member slidably mounted within said frame and spaced beneath said table;
   a feed member mounted for engagement with means to feed a workpiece to said shaping equipment;
   drive means drivably connected to said feed member;
   a cam follower assembly attached to said flat plate member cooperating with said feed member for engagement with said means to feed a workpiece to said shaping equipment, said cam follower assembly being horizontally movable independent of said feed member; and,
   means to raise and lower said cam follower assembly.

2. The combination of claim 1 wherein said means to raise and lower said cam follower assembly includes a vertically extending piston movable in response to a first air cylinder cooperatively attached to a cam follower, said first air cylinder being actuated by a first actuating means.

3. The combination of claim 2 including a horizontally extending piston movable in response to a second air cylinder, said horizontally extending piston attached to said flat plate member whereby said flat plate member moves horizontally in response to movement of said horizontally extending piston, said second air cylinder being actuated by a second actuating means, said second actuating means being actuated by said vertically extending piston upon vertical movement of said vertically extending piston a preselected distance.

4. The combination of claim 1, said frame having a pair of aligned apertures on opposed ends thereof receiving a pair of rod members in parallel therethrough, said rod members having said flat plate member slidably mounted thereon.

5. The combination of claim 4, said table having brackets on opposite sides mounted on the underside thereof receiving moving means attached on opposite sides of said flat plate member.

6. The combination of claim 5, said brackets being C-shaped in cross-section in spaced facing relation, said moving means being rotatably attached rollers.

* * * * *